April 19, 1966  D. C. SCHLUDERBERG ETAL  3,247,068
FAST BREEDER REACTOR AND METHOD OF OPERATION OF SAME
Filed Feb. 28, 1963
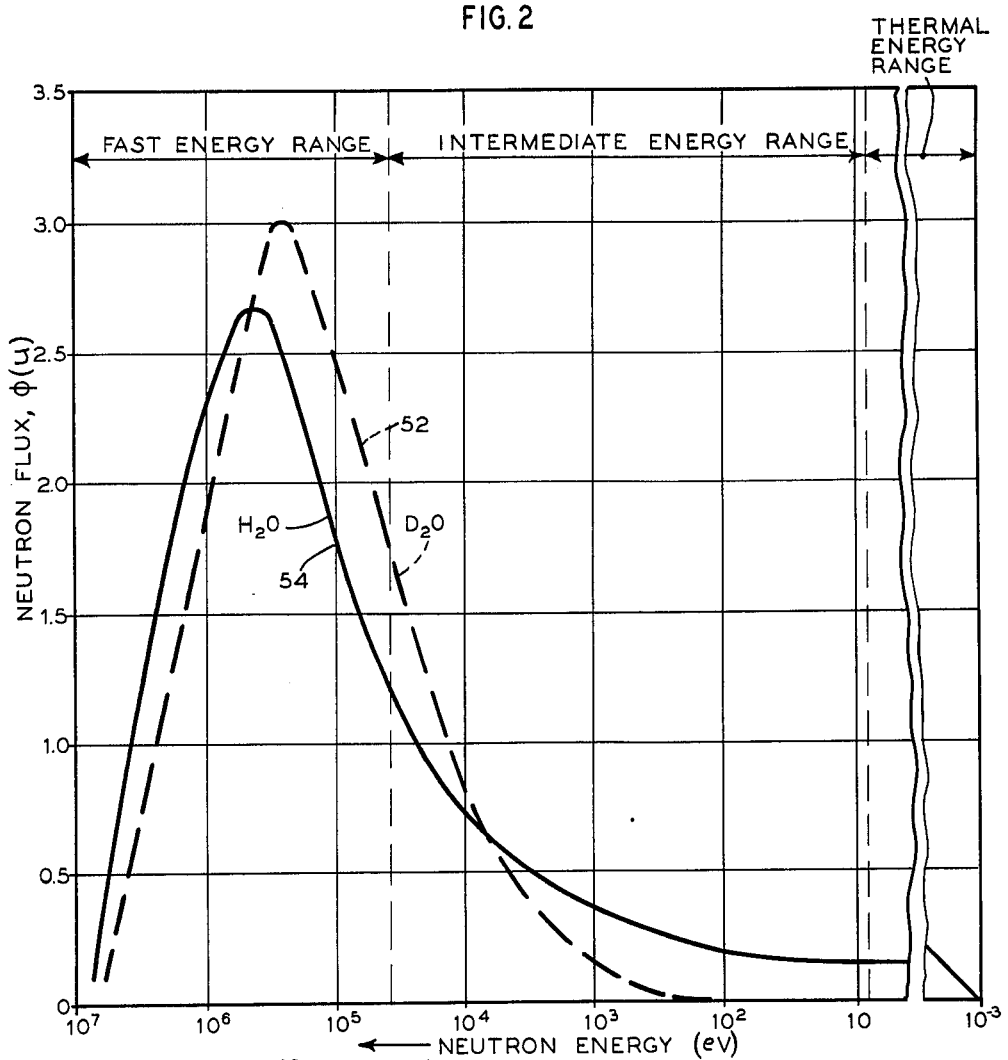
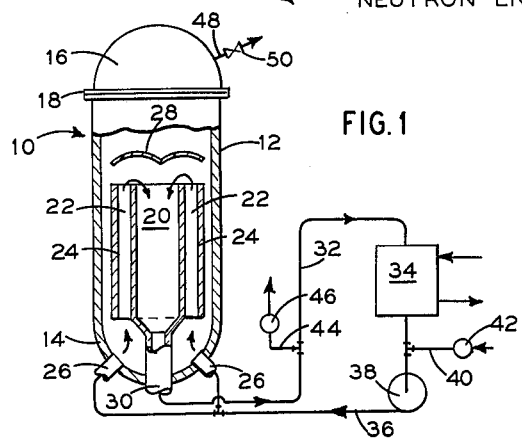
INVENTORS
Donald C. Schluderberg
Howard S. Barringer
BY
ATTORNEY United States Patent Office 3,247,068
Patented Apr. 19, 1966

3,247,068
FAST BREEDER REACTOR AND METHOD OF OPERATION OF SAME
Donald C. Schluderberg, Lynchburg, and Howard S. Barringer, Rustburg, Va., assignors to The Babcock & Wilcox Company, New York, N.Y., a corporation of New Jersey
Filed Feb. 28, 1963, Ser. No. 261,627
17 Claims. (Cl. 176—18)

The present invention relates in general to a fast breeder nuclear reactor, and more particularly, to a method of operating such a fast breeder reactor wherein a single phase moderating fluid or mixture of such fluids capable of undergoing a substantial change in density with a change in heat content is utilized to variably control the chain reaction.

As disclosed in co-pending applications, Serial Nos. 197,082, 197,060, and 158,022, it has been found possible to variably moderate and control the chain reaction in a thermal nuclear reactor by utilizing a high pressure, high temperature hydrogen-bearing vapor such as supercritical steam. It is the purpose of the present invention to apply this method of operation to a fast breeder type nuclear reactor.

Nuclear reactors have been classified as being either fast or thermal, depending upon the average speed of the neutrons primarily utilized to sustain the fission type chain reaction. Generally, reactors utilizing neutrons having an average kinetic energy greater than 10,000 electron volts have been classified as fast reactors while those operating with neutrons having a kinetic energy less than 1 electron volt have been classified as thermal reactors. It has been known that a fast reactor is highly desirable on the basis that fertile material may be more efficiently converted to a fissionable material by irradiation in such a fast reactor. While a smaller amount of such conversion has been possible in thermal reactors, the conversion ratio has been relatively low. A limiting factor in the use of fast reactors, however, has been the fact that they are relatively difficult to control, and have had relatively short core life due to safety considerations. These safety considerations included the fact that control rod materials were not available to efficiently absorb the number of excess fast neutrons necessary to lengthen the core lifetime significantly.

Control of fast reactors disclosed by the prior art has depended upon complex control systems such as movable reflector sections, movable control rods or movable fuel elements in order to achieve the desired change in reactivity. These movable members within the reactor core increase the cost and complexity of the reactor arrangement. In addition, they create within the reactor core undesirable power peaking due, in part, to the variation of the fuel material within the core, or the poison material of the control rods in the core. As is well known in the art, such power peaking is very undesirable due to the resultant peaks in temperature and heat flux within the core, and that reactors of the prior art were thus, of necessity, designed so that the maximum fuel clad surface temperature within the core was maintained within safe limits, thereby lowering the average temperature and power density of the core. It is known that if the magnitude of such power peaking is minimized, the average temperature and heat flux of the reactor core can safely be raised with consequent increase in the final temperature of the cooling medium and/or an increase in the power output for the same final temperature.

In fast reactors of the prior art it has been deemed impractical to use any fluid other than liquid metals as a coolant within the core. This is because other fluids had either too much moderating power, absorbed too many neutrons, or were not good enough coolants to extract the power per unit of core volume required for satisfactory economics. Accordingly, fast reactors of the prior art have used liquid metals having relatively little moderating effect in the reactor core, such as liquid sodium, as the coolant. While some degree of success has been achieved, many problems inherent in the use of these materials have been encountered, among them being the necessity of guaranteeing no coolant leakage from the reactor system. Additionally, when using liquid sodium as the coolant, it has been necessary to utilize an intermediate coolant circuit to transfer the heat of the reactor from the sodium to steam which may then be used in a conventional turbo-generator. This intermediate circuit is mandatory to prevent any possible chemical reaction which might otherwise occur should a leak develop between the liquid sodium and the water. The most common material used in such intermediate circuits is a sodium-potassium eutectic alloy (NaK). The use of an intermediate circuit increases both the complexity and the cost of the reactor system.

When sodium is used as a coolant, there is little or no effect of coolant temperature upon reactivity. In other words, there is usually no significant negative coolant density coefficient of reactivity. In such cases, there is reduced tendency for the reactor to follow system load or for power density to be limited in zones of the core where coolant temperatures are above normal.

By the present invention, it has been found that it is possible to utilize a single phase moderating fluid capable of a substantial change in density with a change in heat content of the fluid to both cool and control a fast reactor. This system is stable and self-regulating and provides a breeding ratio and core lifetime not heretofore achieved with such ease of control. By utilizing a moderating fluid such as $H_2O$ or $D_2O$ steam, or a combination of the two, it is possible to control reactivity by varying the neutron energy spectrum in the core. This in turn changes the ratio of number of fissions to number of neutrons captured in fertile material within the core, the average energy of neutrons causing fission, and the leakage of the neutrons from the core. These effects are produced by varying the concentration of the moderating fluid within the core and/or varying the mixture of fluids having different moderating power. Such a system, when utilizing steam, may be regulated by diluting $H_2O$ steam with $D_2O$ steam and/or by varying the density of the steam within the core by varying the steam pressure and/or temperature. In the operation of such a system, the reactor tends to be self-regulating, increasing power to match an increase of the external load and decreasing power to match a decrease of the external load.

Additionally, the breeding of fissionable material from a nuclear fertile material disposed in the core and in blanket regions surrounding the reactor core is enhanced by utilization of the control method of the present invention, since parasitic absorption by control poison materials and/or control by varying reflector or blanket geometry are eliminated.

The various features of novelty which characterize the invention are pointed out with particularity in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

Of the drawings:
FIGURE 1 is a schematic illustration of the reactor system of the present invention; and FIGURE 2 is a graphical representation of neutron flux vs. neutron energy.

A schematic illustration of a reactor system of the present invention is presented in FIGURE 1 wherein the reactor 10 is provided with a suitable pressure retaining vessel 12, shown here partly in section as an elongated cylindrical pressure vessel having suitable end closure members 14 and 16, one of which may be removably attached thereto as at flange joint 18.

A fast reactor core 20 containing fissionable and fertile material is provided within the interior of the pressure vessel and may be constructed and arranged in any well known manner, care being taken to provide good heat transfer characteristics as will be more thoroughly described herein below. Surrounding the exterior of the core 20 is a core blanket 22 containing a fertile nuclear material. Around both the blanket and the core is a neutron reflector 24. This reflector may also be applied to the top or the bottom of the core (not shown). Coolant inlets 26 are provided in the lower head 14 of the reactor vessel connecting directly with the blanket area 22. A means such as a coolant deflector baffle 28 may be disposed at the end of the core opposite the coolant inlet to reverse the direction of coolant flow so that it then passes through the core and then through outlet 30 also provided in the lower head of the pressure vessel. The coolant then flows through the outlet line 32 to a heat exchanger 34 wherein it gives up a portion of its heat by indirect heat transfer to a secondary coolant fluid which then may be utilized in a steam turbine (not shown) or in any other useful manner. The coolant is then returned to the reactor via line 36 by a pump 38.

The core is comprised of a plurality of fuel elements (not shown) of a type well known in the art containing a fuel material such as $U^{235}$, $Pu^{239}$, $U^{233}$ or some mixture of these capable of undergoing fissioning under the influence of fast neutrons. These fuels normally will be mixed with a fertile material such as $U^{238}$ or $Th^{232}$ capable of absorbing excess neutrons to form $Pu^{239}$ or $U^{233}$, respectively. As is well known in the art, these fuel elements are arranged with a critical mass of fissionable material capable of sustaining a fission type chain reaction. The reflector around the reactor is formed of a neutron reflecting material such as nickel or stainless steel and acts to minimize the escape of neutrons from the core region and returning them to the core area to further promote the chain reaction and conversion of fertile material to fuel.

The blanket area, while not essential to the operation of the reactor, is highly desirable in certain applications where high breeding gain is desired. This blanket will initially contain fertile material with the possiblity of a low concentration of a fissionable material as would be the case of depleted or natural uranium. As the blanket is subjected to irradiation during reactor operation, the fertile material is converted to fissionable material, a portion of which is fissioned contributing to the reactor power output. With the utilization of this blanket, breeding ratios exceeding 1.3 may be achieved using either $U^{233}$-$Th^{232}$, or Pu-$U^{238}$ cycles.

The reactor coolant system is provided with a supply line 40 having a flow metering device 42 and opening in the inlet of pump 38. An exhaust line 44 having a flowing metering device 46 is also provided in the coolant system and will be situated in the outlet line 32. The metering devices 42 and 46 may be of any type well known in the art and may include metering valves or positive displacement pumps, the primary requirement of such metering devices being that they be capable of introducing or withdrawing accurately determined amounts of fluid into or from the reactor circuit for controlling the reactivity of the reactor as will be further described.

An exhaust line 48 in the upper head 16 of the reactor, with a relief valve 50, which may be either automatic or selectively operable, as conditions dictate, is arranged to vent fluid from the reactor to a low pressure receiver (not shown).

The reactor core and the system coolant volumes are proportioned such that a portion of the coolant will shift from the reactor core into other portions of the system as coolant enthalpies and system pressures rise. This is necessary to provide satisfactory reactor stability characteristics at all times. Initially, without fluid in the reactor core, the reactor will be incapable of sustaining a fission type chain reaction since the neutron energy spectrum will be sufficiently high that the number of neutrons escaping from the outer surface of the core will be sufficiently great to keep the multiplication factor, K, less than 1. Upon the introduction of a coolant fluid having neutron moderating capabilities, the average energy of the neutrons within the reactor core is reduced due to increased moderation. This reduces the probability of neutron leakage from the core and the average energy of neutrons causing fission. As moderator is added, the multiplication factor will reach a value of 1 making the core critical and resulting in a self-sustaining fission type chain reaction. It should be noted that while criticality is reached by the method described herein, the amount of moderation is not intended to be so great as to reduce the average neutron speed into the epithermal or thermal energy ranges.

It is the intent of the present invention to utilize a single moderating fluid for both the coolant and the control of a fast breeder reactor. This fluid is charcaterized as being a single phase hydrogen-isotope containing fluid capable of a substantial change in density with a change in enthalpy or heat content, whereby the reactor is controlled by varying the neutron spectrum in the core and blanket regions. This in turn varies the ratio of core fissions to neutron absorptions by fertile material in the core, the average energy of neutrons causing fission, and the amount of leakage of neutrons from the core. This control is accomplished by varying the concentration of a hydrogen-isotope and/or by varying the relative quantities of a mixture of hydrogen-isotopes in the reactor core. Such a variation of hydrogen-isotope concentration may be achieved by diluting the fluid with an inert gas or by varying the density of the hydrogen-isotope containing fluid within the reactor core.

A single phase fluid capable of undergoing a substantial change in density with a change in heat content may be characterized by water from near to or above the critical pressure and temperature or by superheated or supercritical steam. A hydrogen-isotope containing fluid would include light and heavy water ($H_2O$ and $D_2O$), vaporous hydrocarbons, free hydrogen or combinations of these with each other or with other compatible gases. Of these it is contemplated that varying mixtures of heavy and light water in the form of steam, preferably in the form of supercritical steam, can be most advantageously used as a coolant and regulator of a fast reactor.

It is thus the purpose of the present invention to cool and control a fast breeder reactor by introducing high temperature, high pressure steam into a reactor core which, as described above, is not capable of sustaining a fission type chain reaction because the excessive escape of neutrons from the periphery of the core. Upon the introduction of steam of the desired density and $D_2O$ to $H_2O$ ratio, for instance, of approximately 5.8 pounds per cubic foot and 85% $D_2O$ and 15% $H_2O$ by weight, a neutron energy spectrum will be produced in the reactor core such that criticality is achieved. By varying the steam density and the ratio of $D_2O/H_2O$ in the steam within the reactor core, it is possible to vary the output of the reactor as well as to compensate for the excess fuel in the reactor core at the beginning of core life, which provides for the desired reactor lifetime, and for the buildup of fuel or fission product poisons. Thus when the reactor is initially placed into operation, with a relatively large amount of fissionable material therein and a correspondingly low amount of neutron poison material, relatively little slowing down or moderation of the neutrons is necessary to achieve criticality. Accordingly, $D_2O$ steam at a pressure of approximately 3500 p.s.i.a. and a mean temperature of approximately 900° F., and containing approximately 20% $H_2O$ by volume, may be utilized as both the coolant and the controller of the reactor during initial operation. This steam may be introduced into the reactor core at approximately 750° F. and 3500 p.s.i.a. and will leave the reactor at approximately 1050° F. and 3400 p.s.i.a, having a mean density of approximately 7.00 pounds per cubic foot. As the reactor is operated, the amount of fuel contained in the core will decrease in cases where the core conversion ratio is less than 1.0. This, in combination with the effect of fission product poisons, makes necessary an increase in the density of the coolant fluid within the reactor and/or an increase in the ratio of $H_2O$ to $D_2O$ in the coolant steam. In other words, reactor control is accomplished by addition or extraction of coolant for regulation (short term reactivity effects) and varying the $H_2O/D_2O$ ratio for shim control (long term reactivity effects).

An analysis of the operation of the present reactor will show that by the use of a mixture of single phase fluids capable of undergoing a substantial change in density with a change in heat content, the reactor may be made self-regulating, tending to automatically follow any load changes imposed upon the system. This minimizes the necessity for variable control rods or control fuel elements within the reactor core.

In initiating operation, the reactor and associated systems are brought to equilibrium operating temperature by imparting heat thereto from a suitable heat source (not shown). A mixture of DO and $H_2O$ steam will be circulated through the reactor system at low pressure during this warmup period. When operating temperature is reached, additional $D_2O/H_2O$ vapor mixture will be introduced into the reactor circuit until the amount contained therein is sufficient to provide a coolant density within the reactor core such that criticality is achieved and a self-sustaining fission type chain reaction will result at an equilibrium low power output. Additional vapor is then introduced into the reactor circuit, increasing the vapor density and the reactivity of the reactor. Thus, the power output of the reactor is increased to the normal operating level by increasing the density of the coolant vapor within the reactor coolant circuit. When the reactor is operating at normal power output it will tend to be self-regulating; thus, as the system load is increased, the temperature of the coolant fluid leaving the heat exchanger 34 via line 36 will be lowered, resulting in a lower coolant inlet temperature to the reactor core 20. As a result of the lower temperature entering the reactor core, the steam densiy will be increased. This will cause reactor power to rise so that normal operating temperatures will tend to be maintained if system flow rate is matched to system load. Conversely, should the system load decrease, the temperature of the coolant fluid leaving the heat exchanger 34 will increase, resulting in an increased temperature of the coolant entering the reactor core and a resultant decrease in coolant density. With such a decrease in coolant density, the reactor power will fall until a new equilibrium lower power output is attained. As before, system temperatures and pressures will tend to be maintained if system flow rates are proportionately reduced. During load changes precise control of temperatures and pressures will require changes in coolant inventory within the system or changes in $D_2O/H_2O$ ratios to compensate for various reactivity coefficients and to adjust for the desired heat exchanger log mean temperature differentials so that constant steam conditions are maintained at the turbine throttle.

In order to vary the control capacity of the coolant vapor throughout the lifetime of the reactor to compensate for changes in fuel inventory and fission product poisons, light water ($H_2O$) will be introduced into the circuit by metering device 42 through line 40. At the same time an equivalent amount of coolant will be removed from the system by metering device 46 through line 44. In this way the total quantity of fluid within the reactor system will remain the same but the moderating or slowing down capability of the fluid will be increased due to the greater slowing down ability of hydrogen over that of deuterium. However, it should be noted that should only a change in coolant inventory be desired, an appropriate amount of coolant will be introduced or withdrawn from the system with the $H_2O/D_2O$ ratio remaining constant.

If it is desired to shut down the reactor system the requisite amount of coolant is removed by the metering device 46 until the reactivity falls below unity at zero power level. This shuts the reactor down, after which the fluid remaining in the system is circulated therethrough to remove any decay heat generated by the reactor core.

Should an emergency occur requiring an immediate shutdown or scram of the reactor, relief valve 50 would be opened, venting the reactor coolant to a low pressure receiver immediately reducing the concentration of hydrogenisotope within the core to the point where the chain reaction cannot be sustained. This mode of operation is possible with the reactor of the present invention due to the fact that it is contemplated that the coolant is in either a vaporous state or a liquid state at such pressure and temperature conditions that significant changes in density of the fluid occur for comparatively small changes in the pressure. Such control is not possible in reactors where the liquid coolant is characterized by but slight change in density with substantial changes in temperature and/or pressure. In a pressurized water reactor, the change in coolant fluid pressure resulting from the opening of a relief valve would fail to produce sufficient change in the coolant density to provide effective control of the type and magnitude here disclosed. Neither is such control possible in boiling water reactors since the change in pressure effected by venting would not decrease the density of the moderating fluid sufficiently but would only flash to steam a portion of the boiling liquid there present, leaving the remaining liquid in the core to moderate and sustain the chain reaction.

By utilizing the method of control disclosed by the present invention it is possible to achieve more favorable power profiles throughout the reactor core. If some disturbance within the reactor should cause the reactivity of a certain portion of the core to increase, the temperature of the coolant in that portion would also be increased, decreasing its density and thereby reducing the power density in that region. Additionally, due to the fact that the average density of the coolant entering the reactor core will be higher due to its initial lower temperature, the power curve of the core will be displaced toward the inlet end where, due to the higher temperature differential between the fuel elements and the coolant, higher heat removal rates are possible.

A better understanding of the method of reactivity control can be had by referring to FIGURE 2 where neutron flux is plotted linearly against neutron energy. The neutron spectrum resulting from the use of heavy water is illustrated by trace line 52 whereby it is seen that nearly all neutrons exist in the fast energy range. By trace line 54, it may be seen that in such a fast reactor, utilizing light water as a coolant, while the majority of the neutrons exist in the fast energy range, a significant number also exist in the intermediate and the thermal ranges. Accordingly, as the heavy water coolant vapor is diluted with light water vapor, varying numbers of neutrons will be scattered into the intermediate and thermal energy ranges. As more neutrons are slowed to the intermediate and thermal energy ranges, the ratio of fissions to fertile material absorptions increases thereby increasing reactivity as required for continued operation. So it may be seen that as the neuton energy spectrum is changed, either by addition of light water produced steam, or by an increase in the coolant steam density, more intermediate and thermal fissions will occur, thereby increasing either the power output or providing the shim control required during the life of the reactor core. Furthermore, leakage from the core is reduced since the lower energy neutrons have a lower leakage probability than faster neutrons.

It is contemplated that by utilizing the method of operating a fast breeder reactor as disclosed by the present invention, the large holddown of excess reactivity permitted by this method of control and the high core conversion ratio of fertile material to fissionable material will permit the achievement of average fuel irradiations exceeding 100,000 mwd./tonne.

In order that reactor maintenance, e.g., loading or unloading, may be carried out while realizing the benefit of liquid shielding shut down, control rods may be incorporated into the reactor arrangement. These control rods would be arranged so as to be either fully inserted into the reactor core during the maintenance program or fully withdrawn therefrom during normal operation. This limited use of control rods is possible due to the reactivity control inherent in the variation in coolant density itself. Thus, these control rods would be used only to prevent criticality during reactor maintenance when the core would be full of a neutron moderating liquid.

Table 1 sets forth design details of a reactor corresponding to that therein disclosed.

TABLE 1

| | |
|---|---|
| Reactor power | 2325 mw. heat. |
| Net station output | 1000 mw.(e). ($\eta$=43%). |
| Turbine throttle pressure | 2400 p.s.i.a. |
| Turbine throttle temperature | 1000 F. |
| Reheat steam temperature | 1000 F. |
| U-233 loading (initial) | 2490 kg. |
| Thorium-232 loading (initial) | 22,400 kg. |
| Fuel enrichment (initial) | 10%. |
| Reactor coolant | Steam. |
| Coolant flow | 23,500,000 lbs./hr. |
| Reactor inlet temperature | 750 F. |
| Reactor inlet pressure | 3500 p.s.i.a. |
| Reactor outlet temperature | 1050 F. |
| Reactor outlet pressure | 3400 p.s.i.a. |
| Inlet steam density | 9.55 lb/ft.$^3$. |
| Outlet steam density | 4.44 lb/ft.$^3$. |
| $D_2O$ content in coolant: | |
| At start of core life | 70%. |
| At end of core life | 30%. |
| Specific power output | .401 mwe./kg. U-233. |
| Core life (minimum) | 400 days. |
| Average fuel irradiation | 37.320 mwd./tonne $UO_2$. |
| Initial over-all conversion ratio | 1.27. |
| Heat absorbed by coolant at start of core life: | |
| In core | 95%. |
| in blanket | 5%. |
| Heat absorbed by coolant at end of core life: | |
| In core | 85%. |
| In blanket | 15%. |
| Core fuel pin cladding stainless steel type | 316. |
| Core heat transfer surface | 28,637 ft.$^2$. |
| Average core heat flux | 263,410 B.t.u./ft.$^2$-hr. |
| Peak heat flux | 671,000. |
| Peak to average power ratio | 2.55. |
| Number fuel pins | 78,115. |
| Pressure vessel I.D. | 150 in. |
| Core diameter | 72.0 in. |
| Core height | 84.0 in. |
| Blanket thickness, sides | 17.5 in. |
| Blanket thickness: top and bottom | 17.5 in. |
| Core fuel pin spacing (triangular) | 0.250 in. |
| Core fuel pin O.D. | 0.200 in. |
| Core fuel pin I.D. | 0.184 in. |
| Core fuel pin clad thickness | 0.008 in. |
| Side reflector thickness | 3 in. |
| Equivalent top and bottom reflector thickness | 3 in. |
| Reflector material—Stainless steel type | 304. |

Volume fractions

| Material | Core | Side Blanket | Top Blanket | Bottom Blanket |
|---|---|---|---|---|
| $UO_2$-$ThO_2$ | 0.491 | | | |
| $ThO_2$ | | 0.651 | 0.491 | 0.491 |
| Clad (SS-304) | 0.094 | 0.101 | 0.094 | 0.094 |
| Steam | 0.415 | 0.248 | 0.415 | 0.415 |
| | 1.00000 | 1.00000 | 1.00000 | 1.00000 |

The superiority of the reactor of the present invention results from the use of high pressure steam both for cooling and control. Moreover, the use of supercritical steam permits development of compact reactor cores capable of substantially higher power outputs per unit of core volume, using currently available sizes of pressure vessels. Controlled variation of steam density and the $D_2O/H_2O$ ratio during the useful life of the core advantageously achieves reactivity control. Furthermore, it is to be understood that the positionable control rods may be replaced by a system of positive displacement pumps and relief valves whose sensitivity is amenable to close regulation, as described above, to produce controlled changes in reactivity by varying reactor system steam inventory and $D_2O/H_2O$ ratio. Maximum clad surface temperatures in this reactor are unusually low due to the absence of control rods, the flat radial power characteristic, and a skewed axial power profile in which the power peaks an appropriate amount in the cold end of the core. These power profiles in combination with high reactor system efficiency and excellent coolant thermal characteristics, permit a high power density, as set forth above.

The present reactor arrangement is also superior to so-called fast reactor arrangements of the prior art utilizing liquid sodium as a coolant, in that comparable or greater heat transport capacity is available with the use of supercritical steam as a coolant than is possible with liquid sodium depending upon the temperature range used. For example, should the reactor inlet and outlet temperatures be 710 F. and 1050 F., respectively, it will be possible for supercritical steam to remove approximately 5.7 times the amount of heat removed by liquid sodium for the same amount of pumping power expended.

Additionally, since deuterium at densities less than about 8 pounds per cubic foot does not scatter neutrons as much as does sodium, a faster neutron spectrum is possible, thus making feasible the utilization of the plutonium-239–U238 cycle.

As a result of the utilization of an intermediate and fast neutron spectrum it is possible to use stainless steel as a structural material within the reactor core without an excessive amount of neutron loss. This is due to the fact that the major neutron absorption resonance cross sections of stainless steel are below the average energy of the neutrons within the reactor core.

While in accordance with the provisions of the statutes there is illustrated and described herein a specific em-

What is claimed is:

1. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core a single phase hydrogen-isotope containing fluid capable of a substantial change in density with a change in heat content, circulating said fluid through said fixed regular flow channels in said core while maintaining said fluid in a single phase throughout said core, and controlling reactivity by varying the neutron spectrum in the core and the leakage of neutrons from said core by varying the concentration of hydrogen-isotope in said core.

2. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core a single phase hydrogen-isotope containing vapor capable of a substantial change in density with a change in heat content, circulating said vapor through said fixed regular flow channels in said core while maintaining said vapor in a single phase throughout said core, and controlling reactivity by varying the neutron spectrum in the core and the leakage of neutrons from said core by varying the density of said vapor to vary the concentration of hydrogen-isotope in said core.

3. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core a single phase hydrogen-isotope containing vapor capable of a substantial change in density with a change in heat content, circulating said vapor through said fixed regular flow channels in said core while maintaining said vapor in a single phase throughout said core, and controlling reactivity by varying the neutron spectrum in the core and the leakage of neutrons from said core by varying the amount of said hydrogen-isotope in said vapor to vary the concentration of hydrogen-isotope in said core.

4. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core a single phase hydrogen-isotope containing vapor capable of a substantial change in density with a change in heat content, circulating said vapor through said fixed regular flow channels in said core while maintaining said vapor in a single phase throughout said core, and controlling reactivity by varying the neutron spectrum in the core and the leakage of neutrons from said core by varying the amount of said hydrogen-isotope in said vapor and the density of said vapor in said core.

5. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core steam capable of a substantial change in density with a change in heat content, circulating said steam through said fixed regular flow channels in said core while maintaining said steam in a single phase throughout said core, and controlling reactivity by varying the neutron spectrum in the core and the leakage of neutrons from said core by varying the density of steam in said core.

6. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core high temperature high pressure steam capable of a substantial change in density with a change in heat content, circulating said steam through said fixed regular flow channels in said core while maintaining said steam in a single phase throughout said core, and controlling reactivity by varying the neutron spectrum in the core and the leakage of neutrons from said core by varying the density of said steam in said core and by diluting said steam with a nonmoderating fluid.

7. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core high temperature high pressure steam containing hydrogen and deuterium, said steam being capable of a substantial change in density with a change in heat content, circulating said steam through said fixed regular flow channels in said core while maintaining said steam in a single phase throughout said core, and controlling reactivity by varying the neutron spectrum in the core and the leakage of neutrons from said core by varying the density of said steam in said core.

8. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core high temperature high pressure steam containing hydrogen and deuterium, said steam being capable of a substantial change in density with a change in heat content, circulating said steam through said fixed regular flow channels in said core while maintaining said steam in a single phase throughout said core, and controlling reactivity by varying the neutron spectrum in the core and the leakage of neutrons from said core by varying the proportion of hydrogen to deuterium in said steam.

9. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core supercritical steam containing hydrogen and deuterium, circulating said steam through said fixed regular flow channels in said core, and controlling reactivity by varying the neutron spectrum in the core and the leakage of neutrons from said core by varying the proportion of hydrogen to deuterium in said stream and by varying the density of said steam in said core.

10. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, and a neutron reflector disposed about said core, said method comprising the steps of effecting reactor criticality by introducing into said core supercritical steam containing hydrogen and deuterium, circulating said steam through said fixed regular flow channels in said core, controlling reactivity by varying the neutron spectrum in the core and the leakage of neutrons from said core by varying the proportion of hydrogen to deuterium in said steam and by varying the density of said steam in the core, and terminating said chain reaction by reducing the density of said steam in said core.

11. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, a fertile material containing blanket surrounding said core, and a neutron reflector disposed about said blanket and said core, said method comprising the steps of effecting reactor criticality by introducing into said core and said blanket supercritical steam containing hydrogen and deuterium, circulating said steam through said fixed regular flow channels in said core, controlling reactivity and fertile material absorption by varying the neutron spectrum in the core and the leakage of neutrons from said core by varying the proportion of hydrogen to deuterium in said steam and by varying the density of said steam in said core.

12. The method of operating a heterogeneous nuclear reactor comprising a core containing a plurality of fissionable material-bearing fuel elements arranged to have a positive coolant density coefficient of reactivity and having an operating neutron spectrum energy level substantially above the thermal neutron level, said fuel elements being arranged in a fixed lattice in said core, said core having a plurality of fixed regular flow channels therethrough, a fertile material blanket surrounding said core, and a neutron reflector disposed about said blanket and said core, said method comprising the steps of effecting reactor criticality by introducing into said core and said blanket supercritical steam containing hydrogen and deuterium, circulating said steam through said fixed regular flow channels in said core, controlling reactivity and fertile material absorption by varying the neutron spectrum in the core and the leakage of neutrons from said core by varying the proportion of hydrogen to deuterium in said steam and by varying the density of said steam in said core, and terminating said chain reaction by reducing the density of said steam in said core.

13. A heterogeneous nuclear reactor comprising a body of fissionable material arranged as a plurality of fuel elements in a core to undergo a self-sustaining fission-type chain reaction having an operating neutron spectrum energy level substantially above the thermal neutron level and having a positive coolant density coefficient of reactivity, said fuel elements being arranged in a fixed lattice in said core, said core having a plurality of fixed regular flow channels therethrough, a body of neutron reflecting material surrounding said core, means for passing a single phase hydrogen-isotope containing fluid capable of a substantial change in density with a change in heat content through said core, and means for varying the hydrogen-isotope in said fluid to control the fission-type chain reaction.

14. A heterogeneous nuclear reactor comprising a body of fissionable material arranged as a plurality of fuel elements in a core to undergo a self-sustaining fission-type chain reaction having an operating neutron spectrum energy level substantially above the thermal neutron level and having a positive coolant density coefficient of reactivity, said fuel elements being arranged in a fixed lattice in said core, said core having a plurality of fixed regular flow channels therethrough, a body of neutron reflecting material surrounding said core, means for passing high pressure, high temperature steam capable of a substantial change in density with a change in enthalpy through said fixed regular flow channels in said core while maintaining said steam in a single phase throughout said core, and means for varying the density of said steam in said core to regulate the chain reaction.

15. A heterogeneous nuclear reactor comprising a body of fissionable material arranged as a plurality of fuel elements in a core to undergo a self-sustaining fission-type chain reaction having an operating neutron spectrum energy level substantially above the thermal neutron level and having a positive coolant density coefficient of reactivity, said fuel elements being arranged in a fixed lattice in said core, said core having a plurality of fixed regular flow channels therethrough, a body of neutron reflecting material surrounding said core, means for passing supercritical steam containing hydrogen and deuterium through said core, means for varying the proportion of hydrogen to deuterium in said steam, and means for varying the density of said steam in said core to regulate the chain reaction.

16. A heterogeneous nuclear reactor comprising a body of fissionable material arranged as a plurality of fuel elements in a core to undergo a self-sustaining fission-type chain reaction having an operating neutron spectrum energy level substantially above the thermal neutron level and having a positive coolant density coefficient of reactivity, said fuel elements being arranged in a fixed lattice in said core, said core having a plurality of fixed regular flow channels therethrough, a plurality of elements containing a fertile material disposed as a blanket around said core, a body of neutron reflecting material surrounding said core, means for passing supercritical steam containing hydrogen and deuterium through said core and said blanket, means for varying the proportion of hydrogen to deuterium in said steam, and means for varying the density of said steam in said core and said blanket to regulate the chain reaction.

17. A heterogeneous nuclear reactor comprising a body of fissionable material arranged as a plurality of fuel elements in a core to undergo a self-sustaining fission-type chain reaction having an operating neutron spectrum energy level substantially above the thermal neutron level and having a positive coolant density coefficient of reactivity, said fuel elements being arranged in a fixed lattice in said core, said core having a plurality of fixed regular flow channels therethrough, a plurality of elements containing a fertile material disposed as a blanket around said core, a body of neutron reflecting material surrounding said core, means including a closed circuit for passing supercritical steam containing hydrogen and deuterium through said core and said blanket, means for varying the proportion of hydrogen to deuterium in said steam, means for varying the density of said steam in said core and said blanket to regulate the chain reaction, and a valve means in said closed circuit operable to relieve the pressure therein to reduce the density of said steam sufficiently to terminate the chain reaction.

References Cited by the Examiner

UNITED STATES PATENTS 3,081,246   3/1963   Edlund _____ 176—42

FOREIGN PATENTS 131,782   5/1940   Australia.
749,064   5/1956   Great Britain.

OTHER REFERENCES

NDA 2148–4, AEC Document, April 15, 1961, pages 13, 18, 29, 30, 39, 48, 52, and 62.

REUBEN EPSTEIN, *Primary Examiner.*

CARL D. QUARFORTH, BENJAMIN R. PADGETT,
*Examiners.*